(12) United States Patent
Langeman

(10) Patent No.: US 7,318,554 B2
(45) Date of Patent: *Jan. 15, 2008

(54) THIRD STREAM AUTOMOTIVE COLOR INJECTION

(76) Inventor: Gary D. Langeman, 31 RR #2, Ruthven, Ontario (CA) N0P 2G0

( * ) Notice: Subject to any disclaimer, the term of this patent is extended or adjusted under 35 U.S.C. 154(b) by 101 days.

This patent is subject to a terminal disclaimer.

(21) Appl. No.: 10/975,182

(22) Filed: Oct. 28, 2004

(65) Prior Publication Data
US 2005/0103889 A1  May 19, 2005

Related U.S. Application Data

(63) Continuation-in-part of application No. 10/842,781, filed on May 11, 2004, now Pat. No. 7,025,286, which is a continuation of application No. 10/058,871, filed on Oct. 25, 2001, now Pat. No. 6,755,348.

(51) Int. Cl.
  B05B 7/10   (2006.01)
  A62C 5/02   (2006.01)
  B05B 7/04   (2006.01)

(52) U.S. Cl. ............. 239/400; 239/10; 239/8; 239/398; 239/434

(58) Field of Classification Search .......... 239/10.8, 239/9.11, 302, 303, 304–312, 377.388, 434
  See application file for complete search history.

(56) References Cited

U.S. PATENT DOCUMENTS

| 4,221,339 | A |  | 9/1980 | Yoshikawa |
| 4,554,214 | A |  | 11/1985 | Ichinomiya et al. |
| 5,017,673 | A |  | 5/1991 | Balatan |
| 5,058,805 | A |  | 10/1991 | Anderson et al. |
| 5,170,939 | A | * | 12/1992 | Martin ................ 239/112 |
| 5,328,093 | A |  | 7/1994 | Feitel |
| 5,367,982 | A | * | 11/1994 | DeMoore et al. ........ 118/46 |
| 5,388,761 | A |  | 2/1995 | Langeman |
| 5,529,114 | A | * | 6/1996 | Hall et al. .............. 165/41 |
| 5,634,571 | A |  | 6/1997 | Cataneo et al. |
| 5,852,879 | A |  | 12/1998 | Schumaier |
| 5,925,466 | A |  | 7/1999 | Burton |

(Continued)

OTHER PUBLICATIONS

Hare, Clive H., "Chemical Changes Occurring Prior to Applicant-Epoxy Systems" (Dec. 2000) Journal of Protective Coatings & Linings, pp. 49-62.

(Continued)

Primary Examiner—Kevin Shaver
Assistant Examiner—James S. Hogan
(74) Attorney, Agent, or Firm—Nields & Lemack

(57) ABSTRACT

A method and system are provided for injecting a color component into a plural component coating dispensing system. Base, cure and color components are pumped from respective containers at metered volume. The color component, which is preferably a low-viscosity automotive paint is injected into the either the base or cure stream at a point immediately prior to mixing all components in a dispensing device for dispensing the resulting colored fluid mixture onto a surface to be coated. The mixture may be dispensed by pouring or spraying onto the surface. The method and system are particularly useful for mixing and dispensing colored polyurethane or polyurea coatings, such as for spray-on truck bed liners.

5 Claims, 12 Drawing Sheets

U.S. PATENT DOCUMENTS

| | | | |
|---|---|---|---|
| 6,010,562 A | 1/2000 | Flynn et al. | |
| 6,126,999 A | 10/2000 | Tomasino et al. | |
| 6,131,823 A | 10/2000 | Langeman | |
| 6,203,183 B1 | 3/2001 | Mordaunt et al. | |
| 6,250,567 B1 | 6/2001 | Lewis et al. | |
| 6,362,302 B1 | 3/2002 | Boddie | |
| 6,533,189 B2 | 3/2003 | Kott et al. | |
| 6,534,940 B2 * | 3/2003 | Bell et al. | 318/434 |
| 6,755,348 B1 * | 6/2004 | Langeman | 239/10 |
| 7,025,286 B1 * | 4/2006 | Langeman | 239/214.17 |

OTHER PUBLICATIONS

Hare, Clive H., "A Review of Polyurethanes: Formulation Variables and their Effects on Performance" (Nov. 2000) Journal of Protective Coatings & Linings, pp. 34-44.

Muir, Glen, "Introduction to Plural Component Spray" (Feb. 2000) Journal of Protective Coatings & Linings, pp. 67-69.

Allen, Bill, "The Not-so-Simple World of Epoxy Curing Agents" (Jun. 1999) Protective Coatings Europe, pp. 38-44.

REFLEX® Sprayed On Truck Liners brochure, Nov. 2003, pp. 1-4.

* cited by examiner

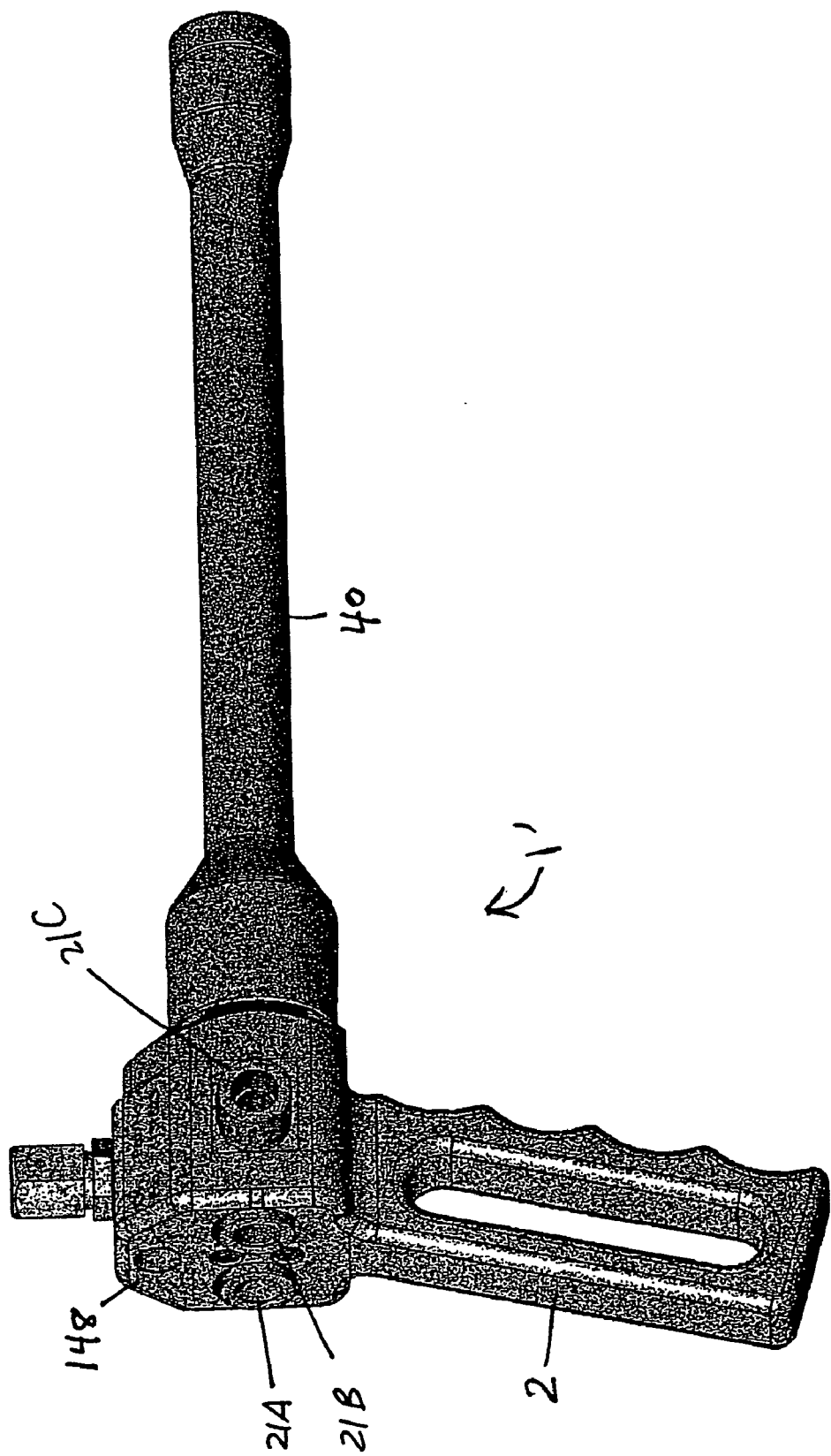

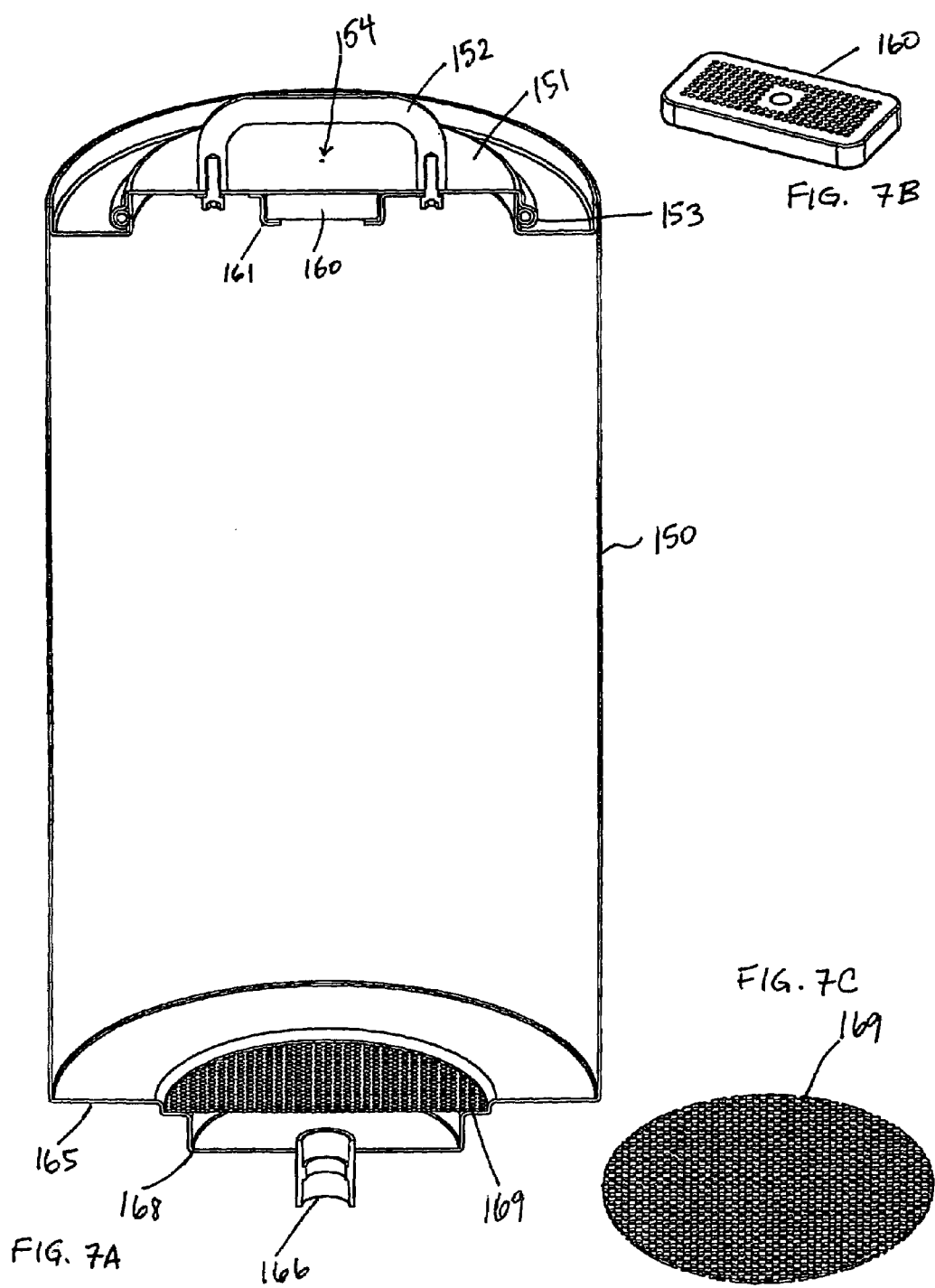

THIRD STREAM AUTOMOTIVE COLOR INJECTION

CROSS-REFERENCE

This application is a continuation-in-part of U.S. patent application Ser. No. 10/842,781 filed on May 11, 2004, now U.S. Pat. No. 7,025,286 which is a continuation of U.S. patent application Ser. No. 10/058,871 filed on Oct. 25, 2001, now issued as U.S. Pat. No. 6,755,348, the disclosures of which are hereby incorporated by reference.

FIELD OF THE INVENTION

This invention relates to plural component coating mixing and delivery methods and systems.

BACKGROUND OF THE INVENTION

Polyurethanes and polyureas have many highly desirable characteristics for the coatings industry. These polymers have well-known abrasion and chemical resistance, flexibility, and impermeability to water when fully cured, as well as being, relatively inexpensive and easy to apply.

Modern plural component delivery systems allow the precise metering, mixing and delivery of polyurethane and polyurea components. One example of such a delivery system is described in U.S. Pat. No. 5,388,761 to Langeman. It is popular to dispense such plural component mixes using plural component spray equipment and spray head blending techniques. Reactive components are pumped in metered quantities to a spray gun, and separate streams are blended immediately before atomization. Atomization of the fluid mix may be achieved through various means, with and without air pressure. A low-pressure stream of air may be introduced to the fluid mix at the nozzle end of the gun. One example of such a spray device is the Low Pressure Dispensing Gun described in U.S. Pat. No. 6,131,823 to Langeman.

Polyurethane and polyurea formulations have a particular reactive chemistry which has been considered to make them incompatible with many standard colorants. Polyurethane coatings are produced from the reaction between an isocyanate and a polyol. An isocynate is a chemical group made up of nitrogen, carbon and oxygen bonded in a particular way and represented as —N=C=0 or NCO. Polyols are specific types of compounds (alcohols) containing hydrogen and oxygen in what are known as hydroxyl groups (represented by OH). The mixing of isocyanate and polyol results in a urethane reaction. When the isocyanate and active hydrogen compound have two or more reactive sites, a polymeric structure is formed. However, isocyanates can react with any type of hydrogen donor. Therefore, the polyurethane reaction can be blocked in the presence of many types of solvents, including water, which are common ingredients of many colorants. Polyureas are produced from a similar chemical reaction between an isocyanate and an amine.

As a result, the colorants presently used with polyurethane and polyurea components are specially-formulated pigment dispersions which do not react undesirably with the polyol component, and which further do not block the desired reaction between the polyurethane or polyurea components. Such specially-formulated colorants have the disadvantages of being difficult to use due to their thick, paste-like consistency, having few available stock colors and finishes, and having limited distribution and sales locations.

The most common method of incorporating colorant into polyurethane is to premix a compatible colorant formulation into one of the component fluids prior to pumping that fluid to a dispensing gun. In this "batch mix" process, a specially-formulated colorant is introduced into a tank containing the polyol component. The mix of colorant and polyol is known to be stable over a period of time (typically, 1-2 hours without re-mixing). The batch mixture is typically stored in a container such as a pail, barrel, or holding tank. When the mixed component is about to be used to form the intended polyurethane coating, it is necessary to stir the batch mixture in order to re-suspend the colorant evenly throughout the polyol. The stirring process is typically done by hand by a technician and may take 1-2 minutes per gallon.

Batch mixing tends to result in considerable waste, since a batch must be mixed for each intended project. It is important that one does not run out of material during the application, therefore, the batch is always greater than the actual project requirement.

Change from one color to the next is especially problematic when using a batch mix technique. The container in which the color is mixed with the polyol is typically used again and must be emptied and cleaned, otherwise many containers are required. Also, the hose or fluid line through which the colored fluid is pumped will also require purging and may never be free of all of the previous color that was pumped through that fluid line. Known specially-formulated colorants also have a high viscosity (e.g. 5,000 cps), which renders them difficult to flush from fluid lines or to clean with simple wiping methods. Solvents used to flush fluid hoses or clean color containers may also leave a problematic residue which may produce undesirable reactions with the polyurethane or polyurea components.

One alternative to standard container batch mixing for plural component coatings is provided in U.S. Pat. No. 6,203,183 to Mordaunt et al. The system provides an in-line paint mixing system for three-component paint that aims to eliminate much of the waste of individual components associated with batch mix by successively integrating "batches" in very small quantities, referred to as "slugs". The slug quantities of the three components are introduced to each other in a manifold 22, are further mixed together downstream in a flow meter 26, are mixed together more thoroughly in an integrator 62 and are finally mixed again in a static mixer 34. The three-component mixture is then introduced to a spray gun completely mixed. The system relies on a complex set of parameters to achieve accurate metering of the various components, which is impacted by changing pressures and orifice sizes.

The Mordaunt process results in numerous mechanical components of the apparatus being contaminated by the mixed fluid in between the holding tanks and the spray gun. The Mordaunt apparatus must be partly dismantled for cleaning or flushing with solvent. Such cleaning would be time-consuming for a technician.

It is also not apparent how the Mordaunt process, which is intended for paint coatings, would work with fast-reacting chemical components, such as the components used in normal polyurethanes and polyureas. In these applications, it is likely that jamming would occur in the lines due to the reactivity of the component slugs.

There is a demand, particularly in the spray-on truck liner market, to color-match the polyurethane or polyurea coating of the liner to the exterior paint of the automobile. At present, this is accomplished somewhat haphazardly by trying to mix pigments in the polyol tank to approximate the color of the automobile paint. This rarely produces satisfactory results, and the pigments are available in a limited selection of colors and cannot match the specialty finishes (including metallic and pearlescent finishes) that are currently in demand for automotive paints. Another method of coloring the truck liners, by adding a sprayed paint top-coat, also produces unsatisfactory results, in addition to being time-consuming.

SUMMARY OF THE INVENTION

It is an object of the present invention to provide a method and system of plural component coating dispensing that permits common, off-the-shelf paint to be used as a colorant, in a way that does not contaminate the delivery means of all other components, inclusive of fluid lines, pumps, manifolds, flow meters, or mixing devices, prior to the mixing chamber and mixing means within the spray gun.

It is a further object of the invention to allow simplified matching of the coating color to the color code of the paint finish of the surface to be coated or, in another instance, to match the coating color to any other desired color identified by pre-assigned color code system developed by the paint manufacturer.

It is a further object of the invention to allow for very fast and efficient change of colors due to the fact that the paint delivery system is the only component of the system to come in contact with the actual paint colorant. The other fluid streams are not contaminated by the paint. The paint colorant system is easily cleaned by using a minimal amount of solvent to flush the paint hopper, pump cylinder, and fluid line. The metering of the paint does not involve a mechanical device or blending process between the metering pump and the spray gun mixing device.

The invention also has an object to simplify the cleaning operation by blowing a small amount of cleaning solvent through the hose using a readily available compressed air supply. Because the color component is kept separate from the plural component pumps that meter the base and cure (first and second) fluid streams, it does not affect those pumps or the fluid hoses by leaving problematic solvent residue that may react with the first or second fluid streams. The invention also enables cleaning of the color orifices of the dispensing gun without entering the fluid lines of the other components. The invention eliminates the waste associated with prior batch mixing systems. All of the colorant remaining in the color pump and fluid line can be saved in its original state since it is not mixed with the other streams.

According to a first aspect of the invention, a method is provided for injecting a color component into a plural component coating spray system. First, second and third components are stored in separate containers or tanks. A first stream of the first component (A) is pumped in a metered volume from the first tank. The first component is preferably an isocyanate. A second stream of the second component (B) is pumped in a metered volume from the second tank. The second component is preferably a polyol. A third stream of the third component is pumped in a metered volume from the third tank. The third component is preferably a color component. The streams are metered in a precise volumetric ratio using a metering means. The ratio may be 1 part A to 1 part B with the third component comprising approximately 2% of the B. Preferably, the metering means includes a third component metering pump calibrated to deliver a precise volume of fluid in a selected volume ratio corresponding to the volume of one of the other plural component fluids. The third component metering pump, utilizing a powered piston within a cylinder, automatically develops fluid pressure high enough to enable injection into the fluid stream of the other fluid component, also being pumped to the dispensing gun.

According to the method, the third stream is injected into the first stream or the second stream at an injection point (preferably, beyond the metering point of the first or second stream). After this point, the first, second and third streams are mixed within a dispensing device to produce a colored mixture. In a preferred embodiment, the third stream enters the first or second stream through an inlet sharing a common passageway with the first or second stream within the dispensing device before the mixing chamber. (Preferably, the mixture is resident within the spray device for a period no longer than approximately 1-5 seconds, depending on reactivity and degree of mixing required.) Finally, the colored mixture is dispensed from the dispensing device onto a surface to be coated. The device can dispense the mixture either by pouring a stream of the mixture onto the surface, or by spraying the colored mixture onto the surface with atomization provided at the dispensing device. While air atomization is a preferred embodiment, it is also possible to employ a spray gun with airless atomization as the dispensing device.

Preferably, the third stream is pumped so that the pressure of the stream is sufficient to exceed the pressure of the first stream or the second stream to which the third stream is injected at the injection point.

The third component may comprise a low-viscosity paint such as an automotive paint. Preferably, the third component is a premixed, non-reactive paint formulation with a long shelf life (i.e. 6 months or longer). The invention allows a common automotive paint formulation, that may not necessarily be compatibly mixed into one of the components for extended periods of time, to be injected into the plural component system immediately (i.e. within seconds) prior to mixing within the dispensing gun, thereby eliminating any negative chemical reactions with the components while at the same time mixing thoroughly and effecting even distribution of color in the final coating. Automotive paint, in particular, has a number of advantages for use in polyurethane and polyurea coatings, including:

Automotive paint includes certain ingredients that prevent ultraviolet deterioration (i.e. is "UV stable"). The pigments used are developed to retain their original color for extended periods of time.

Application considerations dictate that automotive paints have low viscosity and excellent flow out properties, allowing for ease of atomization in gravity flow spray guns used for spray painting. The low viscosity of automotive paint allows for a very small diameter fluid line without creating excessive restriction and back pressure. Typical polyurethane colorants or pigment dispersions are typically at least five (5) times higher than automotive paint in relative viscosity and do not pump through small diameter fluid lines over long distances without substantial pressure increases.

Automotive paint refinishing has been developed for the automotive repair market, so that a paint code exists for nearly every automotive vehicle finish. Numerous paint manufacturers, such as Dupont™ and PPG™, have developed formulae to enable distributors across the country to cross-reference the vehicle paint code with their own library of paint mix formulae to manufacture a matching base paint for instant use by autobody repair shops. By taking advantage of this global network of automotive refinish paint color technology, the need to develop a new and costly database is eliminated.

Automotive paints are relatively easy to clean and flush from fluid lines and machinery components using common solvents. Compressed air will readily blow solvents through fluid lines making cleanup and changeover very efficient. This is in contrast to common high viscosity pigment dispersions used to color polyurethanes, which are difficult to flush from fluid lines or to clean with simple wiping methods.

In addition to automotive paints, it is also useful to employ other industrial finishes suitable for coating exterior surfaces. Other industrial finishes may also have the benefit of a pre-existing library of color formulations to accurately reproduce a known color on a repetitive basis. Typically, a catalogue of color chips or samples accompany the reference library to permit visual color comparison.

The ability to use inexpensive off-the-shelf color components has a business advantage for many small coatings application businesses, since the businesses are not required to have the financial resources to develop color technology on their own.

In addition to an isocyanate, the first component may instead be a prepolymer. The second component may be a polyol, polyol blend, amine, or resin.

The dispensing device is preferably a low pressure dispensing gun, such as the low pressure static mix dispensing gun described in U.S. Pat. No. 6,131,823 to Langeman. The dispensing device could also be a dynamic mix device or an impingement mix device utilizing high or low pressure.

Many surfaces may be coated with the colored mixture produced according to the present method. Examples would be exterior or interior surfaces of vehicles, aircraft, marine craft, motorcycles, trailers, automobile accessories (such as running boards, grill guards, and rocker panels), agricultural implements, playground equipment, and outdoor furniture. The method is particularly useful to produce spray-on polyurethane or polyurea truck bed liners.

One of the advantages of spray-on truck liners over the preformed plastic drop in liners is the ability to offer custom colors. The further advantage of enabling the spray-on dealer to instantly source all available automotive colors locally creates a new and powerful market advantage.

According to another aspect of the invention, a system is provided for injecting a color component into a plural component coating dispensing system. The system includes a first tank comprising a first component, a second tank comprising a second component, and a third tank comprising a third component. The first, second and third tanks are individually connected by separate fluid lines to pump means. The pump means includes separate pumps for delivering a metered volume of each of the three components in three streams according to a predetermined volumetric ratio between the components. To maintain the volumetric ratio, the pump means also comprises a metering means for metering the volume of the first, second and third streams. The system includes an injection means for introducing the third stream into the first stream or the second stream at an injection point beyond the metering means. The streams are pumped toward a dispensing device which mixes the first, second and third streams to produce a colored mixture and then dispenses the colored mixture onto a surface to be coated. The dispensing device may operate by pouring the colored mixture onto the surface, or spraying the colored mixture onto the surface using atomization means within the dispensing device. Air and airless atomization are possible variations.

It is another aspect of the present invention to provide an improved low pressure dispensing gun including a third inlet for the color component at a point in the gun prior to the mixing chamber.

It is another aspect of the present invention to provide, in an atomized state, a plural component mixture, including a color component, the color component comprising a standard automotive paint.

BRIEF DESCRIPTION OF THE DRAWINGS

In order that the invention may be more clearly understood, the preferred embodiment thereof will now be described by way of example with reference to the accompanying drawings, in which:

FIG. 6B is a perspective view of a second side of an improved spray gun 1' showing first, second and third stream inlets.

FIG. 7A is a sectional view of an improved component tank 150 showing lid and filter details.

FIG. 7B is a perspective view of a desiccant cartridge 160 for use in the tank shown in FIG. 7A.

FIG. 7C is a perspective view of a filter disc 169 for use in the tank shown in FIG. 7A.

DESCRIPTION OF THE PREFERRED EMBODIMENT

Figure 1:
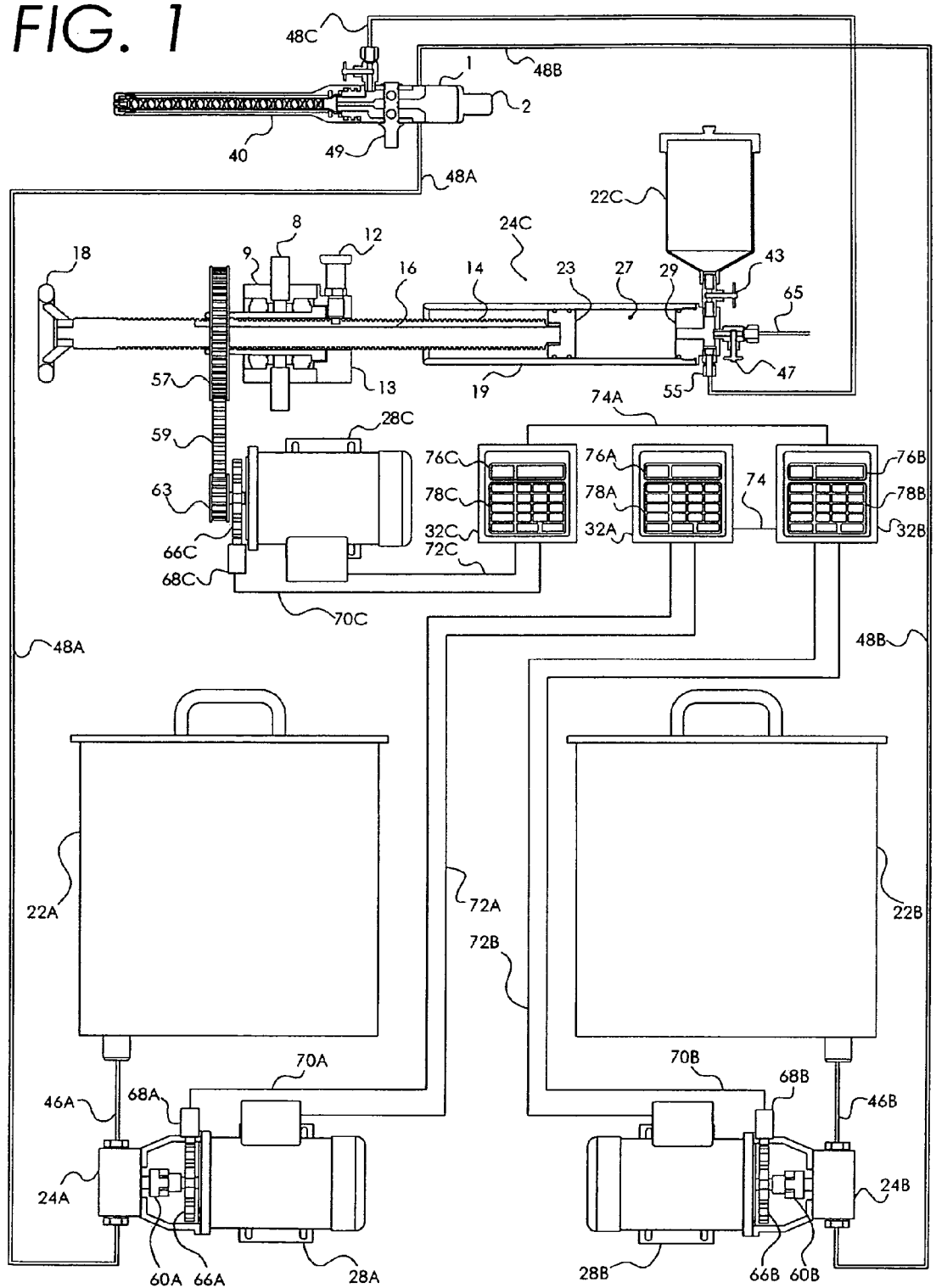
FIG. 1 is a schematic block diagram of the apparatus used to carry out the invention.
Figure 2:
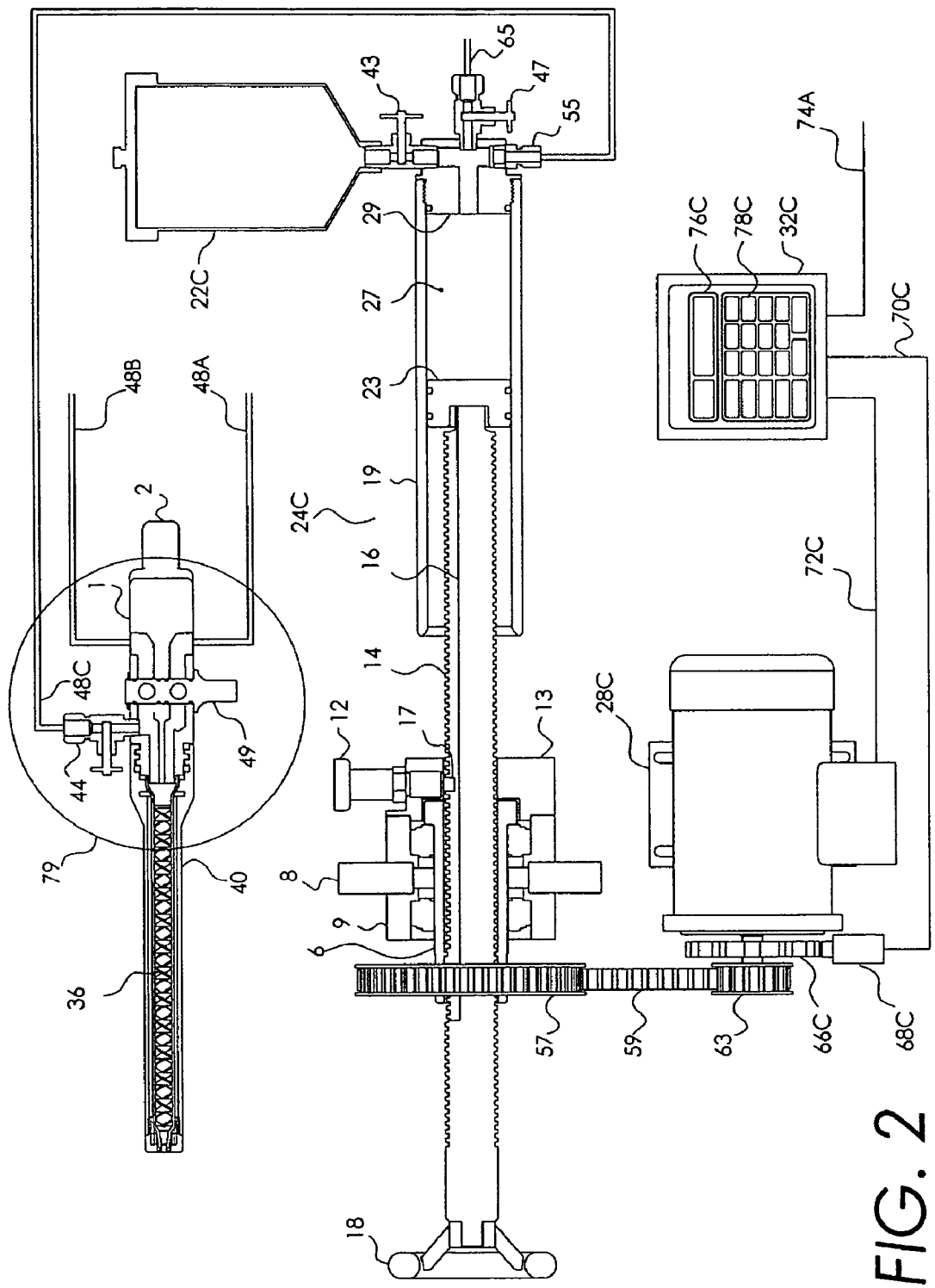
FIG. 2 is a schematic block diagram of the apparatus with particular focus on the color delivery aspects of the invention.
Figure 3:
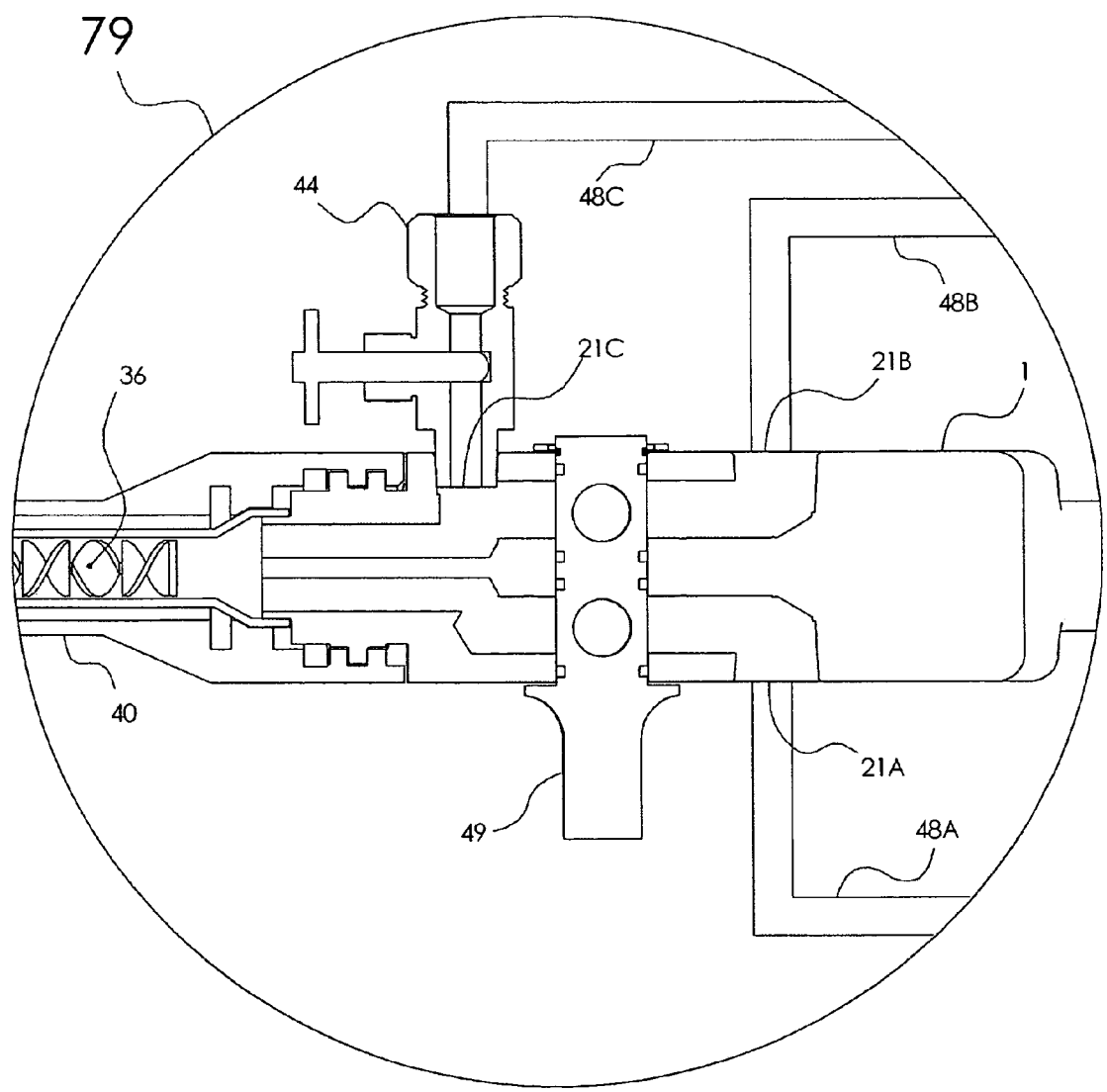
FIG. 3 is a detailed schematic of the area 79 of the spray gun 1 in FIG. 2.
Figure 4:
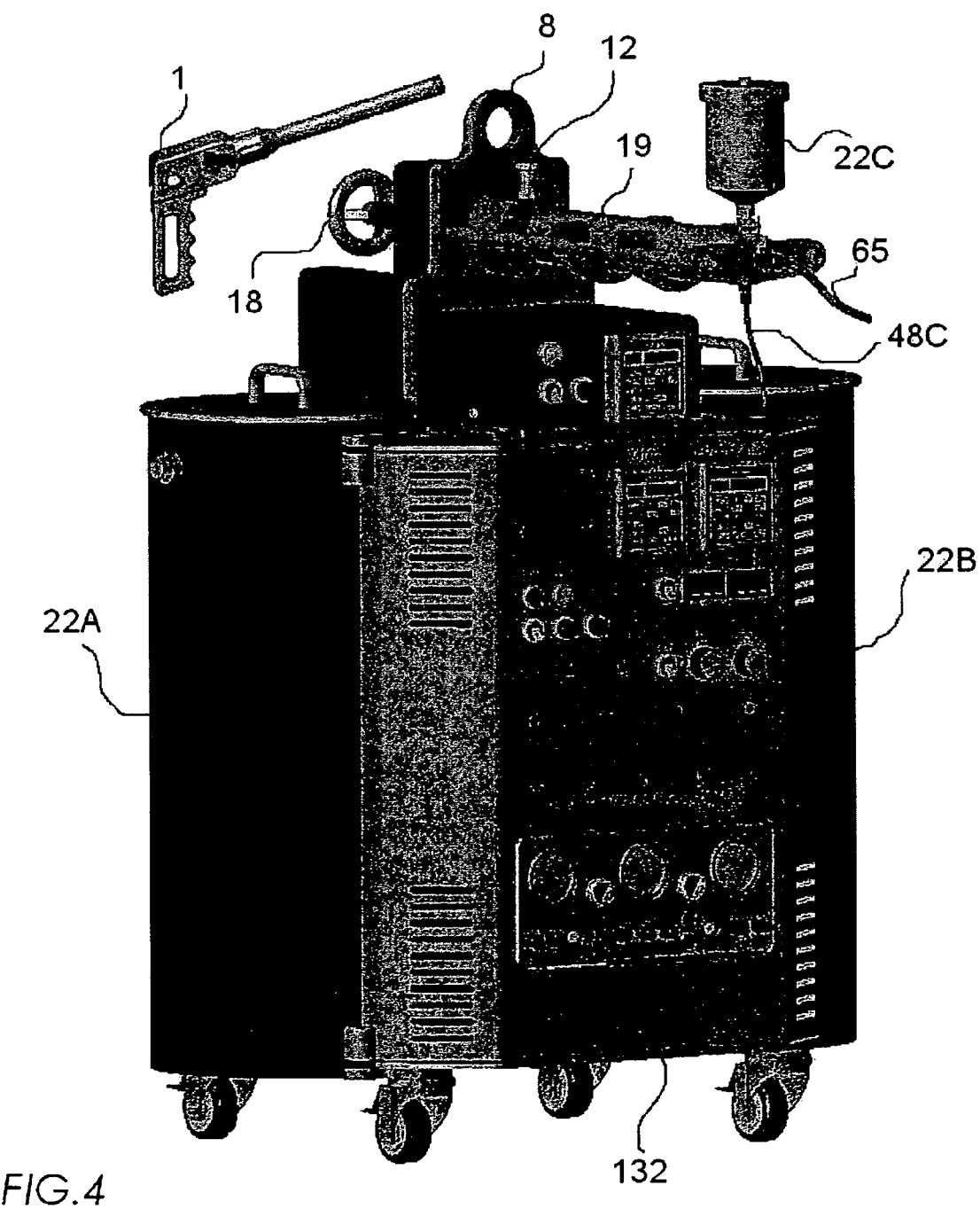
FIG. 4 is a perspective view of a possible housing of the system 132 and the spray gun 1.

FIGS. 1-7C show the apparatus used to effect the method according to the preferred embodiment. The system is preferably contained in a portable unit as shown in FIGS. 4, and 5A-5C. The tanks 22A, 22B include the reactive components. A paint pot 22C is also provided in the unit. The unit 132 may be an enclosed unit with an insulated housing, as shown in FIG. 4. Alternatively, according to a second possible configuration, the system may be an open construction unit 132' on a wheeled cart 136, with handle 138, as shown in FIGS. 5A-5C. The tanks 22A, 22B are preferably heated through a thermostat-controlled heating system (not shown), which is preferably activated when a system power switch is turned on.

The reactive component tanks 22A, 22B are preferably stainless steel canisters, having a capacity of approximately 6 gallons. The paint pot 22C is preferably a smaller stainless steel canister having a capacity of approximately 1 quart.

The reactive components in the tanks 22A, 22B can be very sensitive to moisture or humidity. The air entering the tanks is therefore preferably dried to prevent water-entrainment causing "gassing" or other irregularities due to side reactions in the finished coating.

Advantageously, as shown in FIGS. 7A and 7B (showing a sample tank 150—which could be either the A tank 22A or B tank 22B, or both), a desiccant component, such as a desiccant cartridge 160, may be used for drying the air entering the tank 150. Preferably, a desiccant cartridge 160 is removably mounted in the tank using retaining brackets 161. The tank preferably has a removable lid 151, with handle 152. When closed, the tank lid 151 preferably has a sealing relationship with the top opening of the tank body, using o-rings 153. The desiccant cartridge 160 is preferably located near an inside surface of the tank lid 151 where it can dry air as it enters the tank 150. The tank lid may be provided with one or more breather holes (air inlets, such as 154) through the lid 151 for entry of air to replace fluid as it is pumped out of the tank 150. Preferably, the desiccant cartridge 160 covers these air inlets 154 in the lid 151. Thus, as air from the environment enters the tank 150 through the air inlets 154 in the lid 151, the desiccant acts to passively dry the air going through the cartridge before it comes into contact with the reactive component. The desiccant cartridge is preferably a replaceable off-the-shelf component. One commercially available silica crystal-based cartridge is presently available from Multisorb Technologies, Inc. On average, such cartridges have a working life of approximately 6 months.

The location of the cartridge 160 within the tank 150 ensures that the drying effect is not interrupted by machine shut-off. The desiccant also acts to dry air entering the tank 150 when the tank lid 151 is (advertently or inadvertently) opened with reactive material in the canister, such as for filling or inspection. The cartridge system is both handy and relatively inexpensive, compared with more cumbersome systems such as vacuum based air replacement systems, and the use of blown-in nitrogen gas, which acts as a heavier-than-air blanket over the reactive component. Because the desiccant is passively active on the inside of the tank 150, the arrangement is also an improvement over other common methods that mount the desiccant on the outside of the tank, which only dry the air going into the tank through the dryer. They do not dry the air already resident in the tank.

Preferably, the tanks 150 also include in-tank filtering. As shown in FIG. 7A, the tank 150 preferably includes a serviceable filter element 169 provided in-tank. The filter 169 prevents solid particles from entering the lines via exit port 166 and fouling the system. The in-tank location facilitates cleaning of the filter, or replacement, without the need to dismantle other parts of the system. The filter is preferably a filter plate in the form of a perforated disc 169 as shown in FIG. 7C. Preferably, the tank bottom 165 is formed with a shouldered circular profile 168 sized to retain the filter plate 169 in a position above the position of the exit port 166 on the tank bottom 165.

Figure 6A:
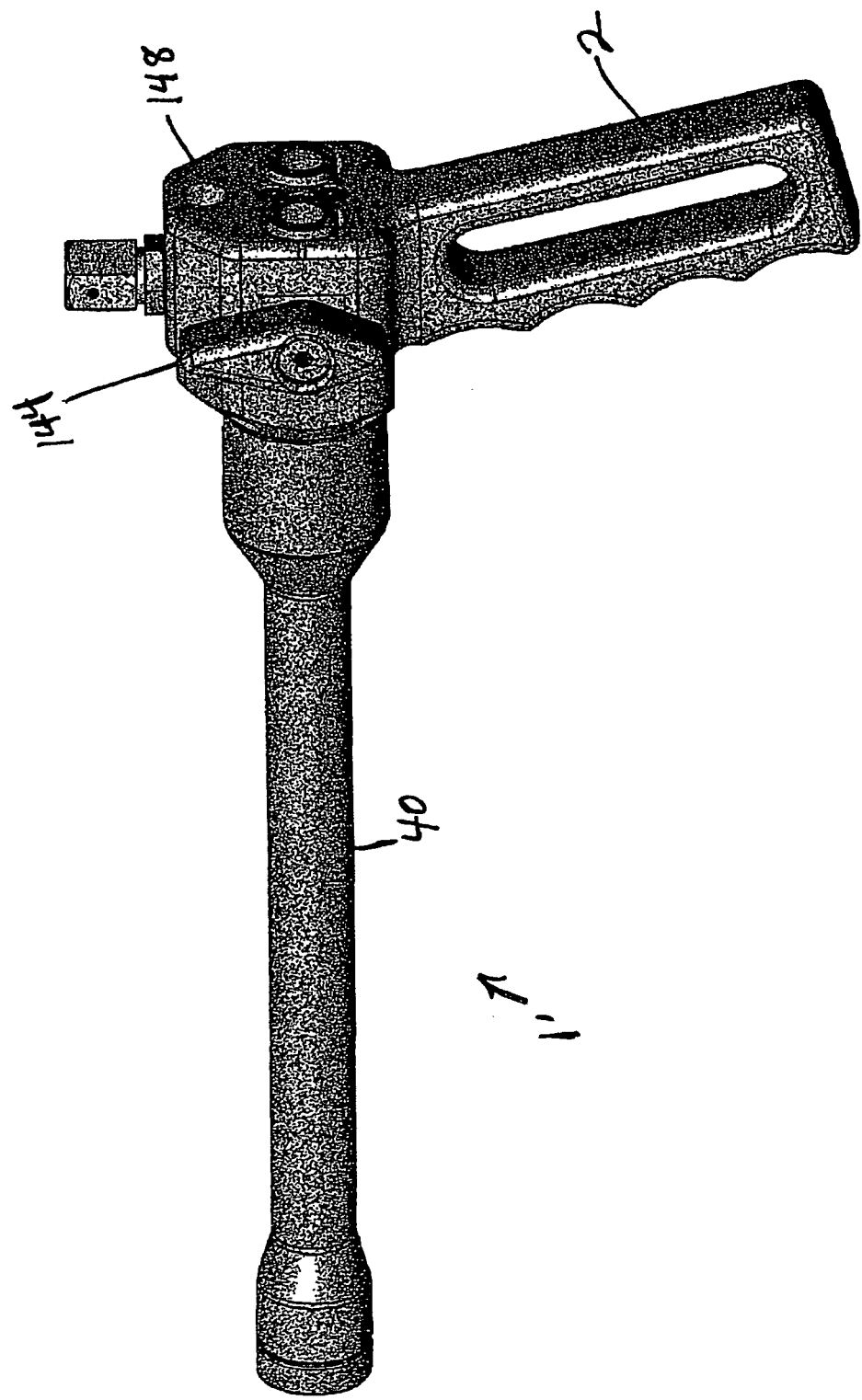
FIG. 6A is a perspective view of a first side of an improved spray gun 1' showing ON/OFF lever.
Figure 6C:
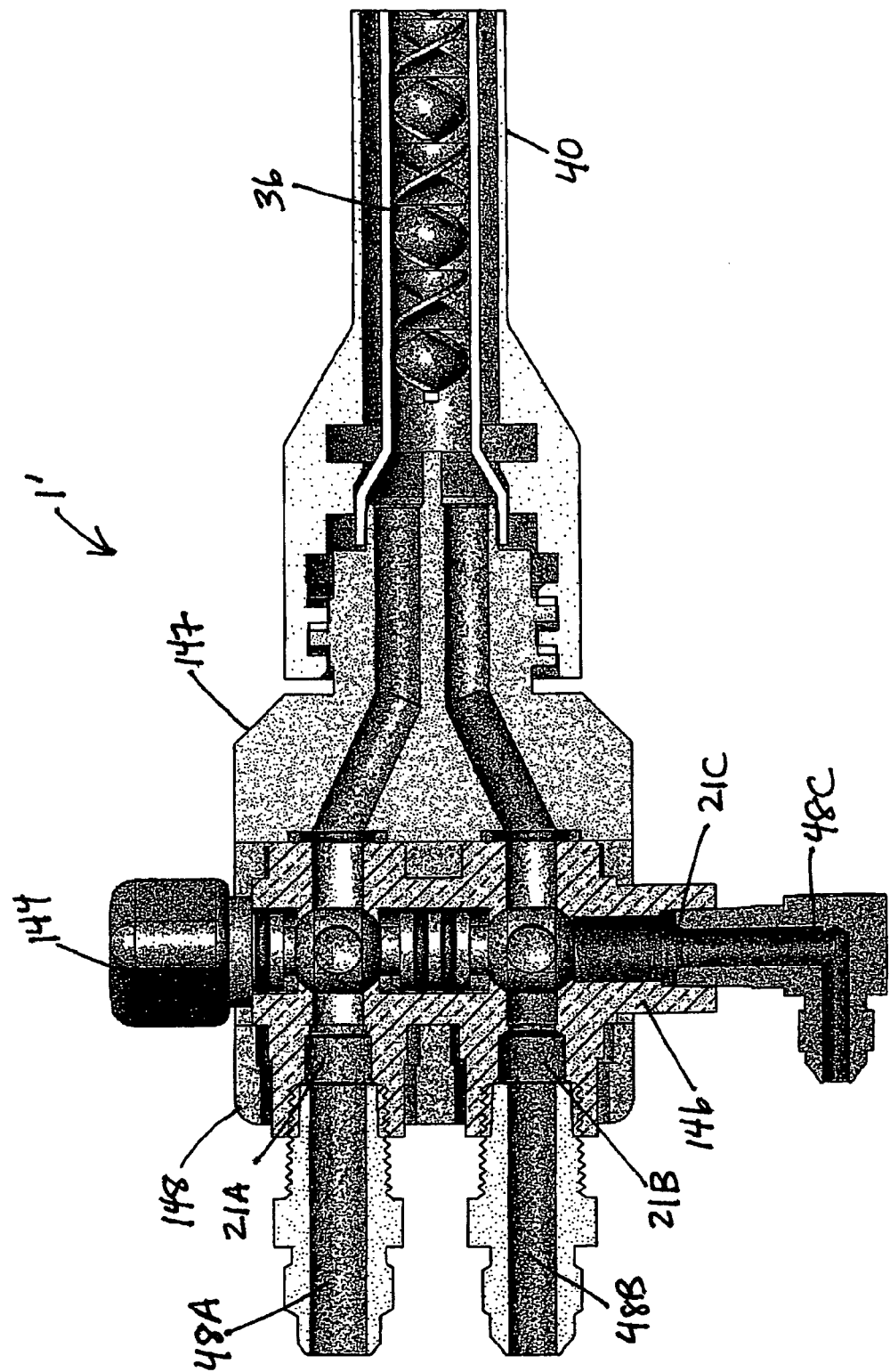
FIG. 6C is a detailed sectional view of improved spray gun 1' (valve in closed position).

The dispensing gun 1 is preferably a static mix low pressure spray gun 1, as shown for illustration in FIGS. 3 and 6A-D. Preferably, as shown in FIG. 6A, an improved spray gun 1' is provided with a single actuating lever 144 that controls the ON/OFF function of all fluid lines 48A, 48B, 48C simultaneously. Preferably, the lever 144 actuates a valve 146 that blocks the three streams simultaneously. Preferably the valve 146 is a multi-port dual ball valve.

Figure 5A:
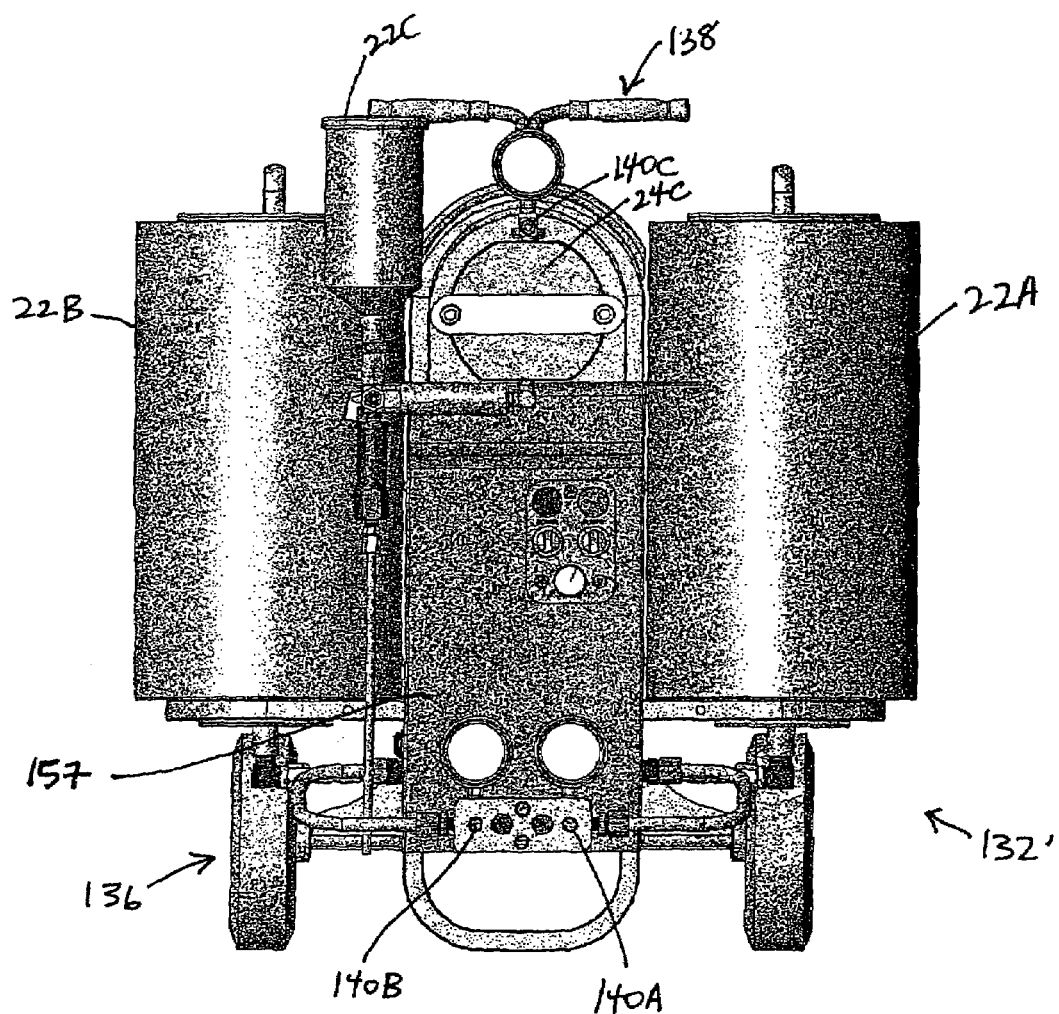
FIG. 5A is a front view of a second possible configuration of the system 132' on a wheeled cart 136.
Figure 5B:
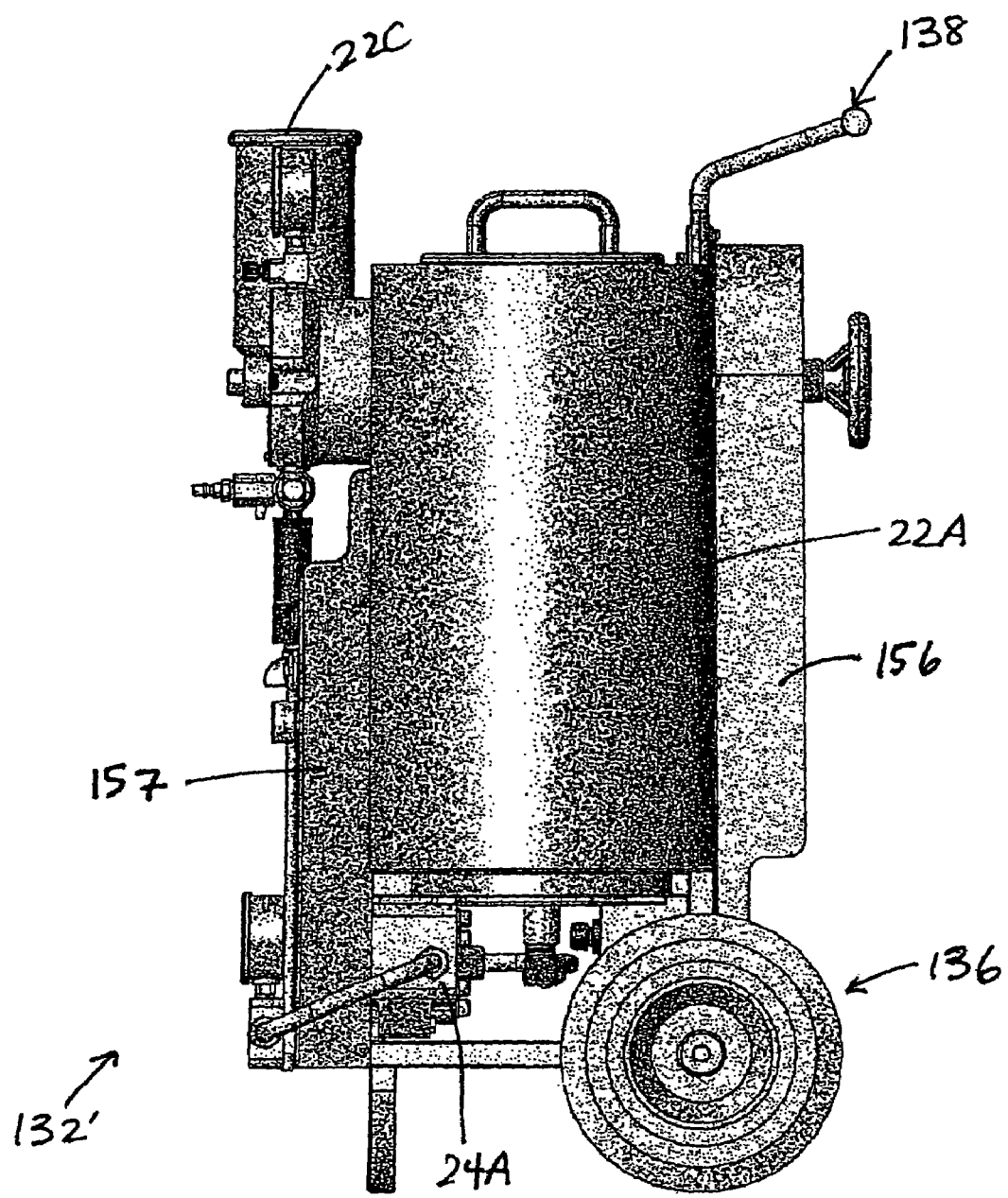
FIG. 5B is a first side view of the second configuration of the system 132'.
Figure 5C:
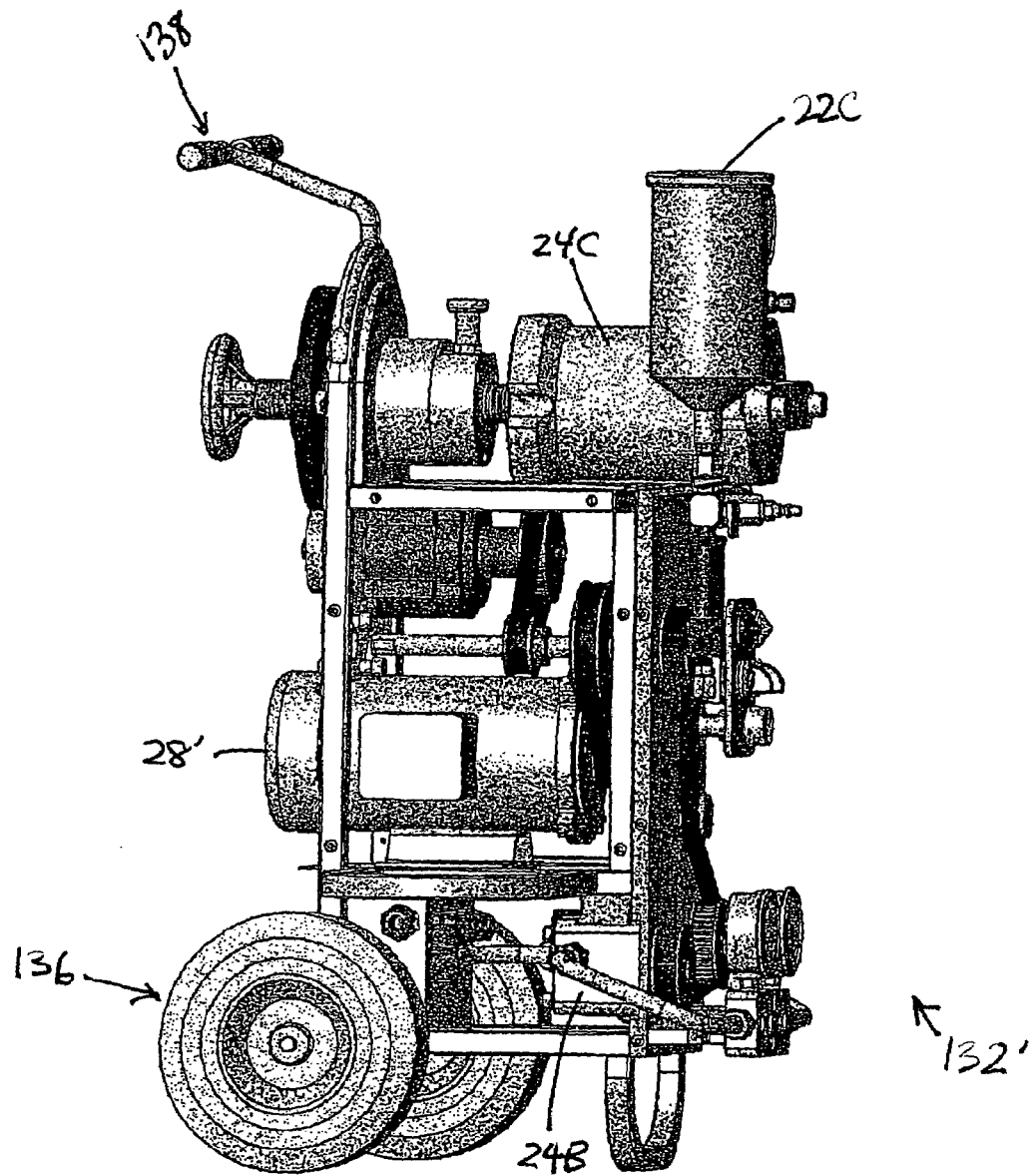
FIG. 5C is a second side view of the second configuration of the system 132', with component tanks 22A, 22B and rear and front covers 156, 157 removed to show interior workings of the system.

To prevent over-pressuring in the fluid lines 48A, 48B, 48C, the motor drive system preferably has a preset electrical current limit of approximately 5 amperes that effectively prevents the drive motors 28A, 28B, 28C from turning when the current reaches the predetermined limit, thereby stopping the pumps 24A, 24B, 24C and maintaining a range of pressure between approximately 600 and 800 psi within the fluid lines 48A, 48B, 48C and valve assembly of the gun 1'. (Advantageously, a single drive motor 28' may be used to power all three pumps 24A, 24B, 24C simultaneously, as shown in FIG. 5C.)

Figure 6D:
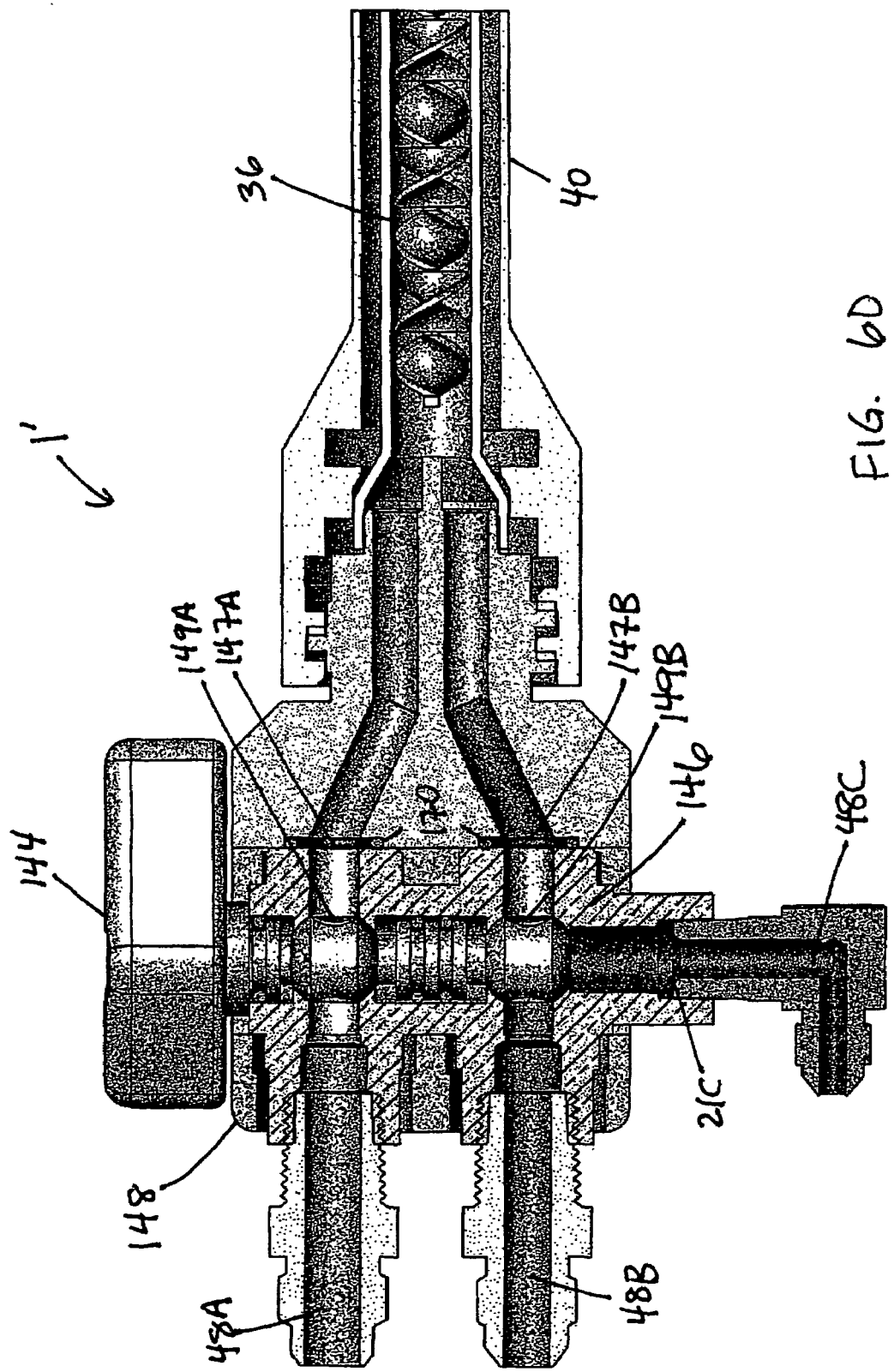
FIG. 6D is a detailed sectional view of improved spray gun 1' (valve in open position).

This self-limiting feature allows for pressure to be maintained in the fluid lines 48A, 48B, 48C within a specific pressure range while in the OFF position. This feature allows for the gun to be turned ON and OFF via lever 144 without shutting off the electrical power to the motor drive system. This feature in effect enables remote control from the spray gun valve lever 144 of the ON/OFF function of the metering pumps 24A, 24B, 24C. No other remote function is, thus, required to stop the metering pumps at a distance away from the machine control panel. By restricting the current to a preset level to the motor that drives the pumps, once the fluid valve on the gun is turned off, the fluid pressure in the lines generated by their respective pumps, can only reach a set limit. When the valve 146 is then turned ON again (as shown in FIG. 6D) by manually rotating lever 144, or, when the pressure drops in the lines 48A, 48B, 48C, the motor 28' will again drive the pumps 24A, 24B, 24C and resume pumping.

This arrangement eliminates the requirement of:
- an electrical interface from the spray gun to the machine via electrical umbilical cord;
- a wireless remote signal from the operator to the machine;
- a pneumatic signal via conduit and valve from the spray gun to the machine; or
- other form of remote control between operator and machine.

In construction, the multiport valve 146 is preferably defined as a component within the gun body 148. The exit ports 149A, 149B of the valve body 146 are in fluid relation with a nose piece 147 that enables the close proximate attachment of static mix device 36 in gun barrel 40. The exit ports 149A, 149B of the valve body 146 and the communicative ports 147A, 147B of the nosepiece are preferably sealed by o-rings 170, compressed between the two bodies. An advantage of the close proximity of the valve exit ports 149A, 149B to the nose piece 147 is that there is very little fluid to clean up when the system is shut down and the static mixer 36 (in gun barrel 40) is removed from the nose piece 147.

According to the preferred embodiment of the method, the locking pin 17 is retracted from the piston rod key seat 16, and the piston 23 is advanced by manually turning a hand wheel 18 in a clockwise rotation until the piston 23 rests against the cylinder end cap 29.

The paint hopper valve 43 and the compressed air valve 47 are closed while the paint fluid line valve 44 is opened to permit air into the system.

Paint is then poured into the paint hopper 22C, the paint hopper valve 43 is then opened, and the piston 23 is retracted by turning the hand wheel 18 in a counterclockwise rotation causing the paint in the paint hopper 22C to flow into and to fill the void 27 in cylinder 19.

Again advancing the piston 23 until a small amount of paint returns into the paint hopper 22C, thereby purging air from the orifices of the cylinder end cap 29 and paint hopper valve 43 and advancing paint into the paint fluid line 48C. The paint hopper valve 43 is then closed and the piston 23 is advanced so that paint fills fluid line 48C, at the same time purging all air out of the paint line 48C and exiting the air through the valve 44 of the spray gun 1. Paint valve 44 of spray gun 1 is then closed so that paint does not escape the system when idle.

Using the locking pin knob 12, the locking pin 17 is then manually engaged into piston rod key seat 16 to permit advancement of piston rod by motorized nut 6 driven by electric motor 28C and belt drive components pulley 63, belt 59 and pulley 57.

Immediately prior to turning on the pumping system, the dispensing gun valve 49 is turned to the on position to permit flow of the first stream and second stream and then the dispensing gun valve 44 is turned to the on position to permit flow of the third stream.

When the power is then turned on to activate the pumping system 132 (sample overall system is shown in FIG. 4), all 3 streams are simultaneously controlled by control means 32A, 32B, and 32C, in such a way that all streams are metered by their respective pumps, 24A, 24B and 24C, that are controlled by control means so as to be delivered to the dispensing gun 1 in a precise volumetric ratio.

As all 3 fluid streams are pumped under pressure into the dispensing gun 1 through respective inlet ports, 21A, 21B, and 21C (shown in FIG. 3), the third fluid stream will only flow into inlet 21C after its respective pressure exceeds the pressure of the second fluid stream entering through inlet port 21B and flowing past inlet 21C through the common fluid passageway 25B.

The third stream is delivered to the dispensing gun by a positive displacement piston pump 24C (shown in FIG. 2) that can generate sufficient pressure to exceed whatever pressure the second fluid stream pump 24B develops while metering its respective controlled flow output. The pressure of the second stream fluid will vary depending upon temperature, viscosity, flow rate, hose size and length, and orifice size of the dispensing gun inlet (within a range of approximately 20 to 400 psi for low pressure systems; and as high as 3,000 psi or greater in high pressure, impingement and dynamic mix systems).

The first and second stream pressures are typically balanced or otherwise controlled to be near equal pressure to each other in order to prevent one stream crossing over in the dispensing gun and back flowing down the opposite fluid line causing an out of ratio situation and reacting in the fluid line rather than in the static mixing tube 36 of the dispensing device 1.

The third stream poses a particular problem for balancing its pressure in relation to the first and second stream because of the small percentage that it represents, typically 1% to 5% of the base component. By using a single stroke piston pump 24C, while engaged and driving the piston forward, the third stream fluid is not permitted to back up in any way, thereby eliminating any possibility of the second stream crossing over into the third stream.

After starting up the pumping system, it is only momentary for the third stream to overcome the second stream pressure at the third stream inlet 21C, allowing the paint to effectively enter the common passageway 25B (see FIG. 3). The second and third streams flow to the static mixer 36 where they come in contact with the first stream flowing through passageway 25A. All three streams flow through the static mixer 36, and mix thoroughly before being dispensed as a reactive fluid on the surface to be coated.

The dispensing gun 1 provides a means for preventing the color stream (third stream) from contaminating the second stream comprising a shut off valve 49 located between the second stream inlet 21B and the third stream inlet 21C. The first stream inlet 21A is also isolated from the third stream inlet 21C by the same valve 49.

The invention also provides for an efficient means of cleaning and flushing the colorant (paint) from the system to permit changeover to a new color. Using the same procedure as for filling the system with paint, the system can be filled with a small amount of solvent which is then flushed out of the system using the pump 24C in its manual mode.

Before cleaning the third stream pump system, the invention provides for recovery of nearly all of the colorant residing in the pump means and fluid lines. The piston 23 can be retracted to accept all of the paint in the paint pot. The third stream fluid line 48C can then be detached from the dispensing gun and the end placed in the original paint can (not shown). The pump can then be manually driven to pump all of the remaining paint from the cylinder into the paint can. The remaining amount in the fluid line 48C can then be blown out of the fluid line by opening the compressed air valve 47 and flushing all remaining paint in the paint fluid line into the original paint can.

The solvent cleaning of the cylinder and paint fluid line can be achieved in the same way using only a small amount of cleaning solvent.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

All patents are incorporated by reference in their entirety to the same extent as if each individual patent was specifically and individually indicated to be incorporated by reference in its entirety.

What is claimed is:

1. A system for dispensing a polymerizing composition, the system comprising:
    a. a first tank comprising a first reactive component;
    b. a second tank comprising a second reactive component;
    c. a paint pot comprising a color component;
    d. a pump means for pumping a metered volume of the first reactive component from the first tank comprising a first stream; and for pumping a metered volume of the second reactive component from the second tank comprising a second stream; and for pumping a metered volume of the color component from the paint pot comprising a third stream; the pump means comprising a metering means for metering the volume of the first, second and third streams;

e. an injection means for introducing the third stream into the first stream or the second stream at an injection point beyond the metering means;

f. a dispensing device in fluid communication with the pump means via fluid lines, the device being adapted for mixing the first, second and third streams to produce a colored mixture; and for dispensing the colored mixture from the dispensing device onto a surface to be coated by either pouring the colored mixture onto the surface, or spraying the colored mixture onto the surface using atomization means within the dispensing device;

wherein the pump means is driven by a single drive motor.

2. The system of claim 1, wherein the dispensing device comprises a spray gun having a lever on the gun for controlling the flow of the first reactive component, second reactive component and color component.

3. The system of claim 2, wherein the lever actuates a valve in the gun which, when closed, acts to prevent the flow of the first reactive component, second reactive component and color component at the gun simultaneously.

4. The system of claim 3, wherein the drive motor comprises a preset electrical current limit, the motor being prevented from driving the pump means when the current limit is reached.

5. The system of claim 4, wherein the valve, when closed, causes over-pressuring in the lines, which in turn, causes the preset electrical current limit to be reached, thereby preventing the motor from driving the pump means.

* * * * *